(12) United States Patent
Gunasekera et al.

(10) Patent No.: US 11,988,167 B2
(45) Date of Patent: May 21, 2024

(54) PLUNGER SEAL APPARATUS AND SEALING METHOD

(71) Applicant: General Electric Company, Schenectady, NY (US)

(72) Inventors: Anthony Michael Gunasekera, New Richmond, OH (US); Donald M. Corsmeier, West Chester, OH (US); Bernard J. Renggli, Cincinnati, OH (US); Steven Kirgiss, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/567,385

(22) Filed: Jan. 3, 2022

(65) Prior Publication Data

US 2023/0213003 A1    Jul. 6, 2023

(51) Int. Cl.
*F02K 1/80*     (2006.01)
*F02K 1/12*     (2006.01)
*F16J 15/34*    (2006.01)

(52) U.S. Cl.
CPC .............. *F02K 1/805* (2013.01); *F02K 1/12* (2013.01); *F16J 15/3436* (2013.01)

(58) Field of Classification Search
CPC ... F02K 1/00; F02K 1/80; F02K 1/805; F01D 11/00; F01D 11/005; F01D 11/006;
(Continued)

(56) References Cited

U.S. PATENT DOCUMENTS

| 3,121,995 A | 2/1964 | Albani |
| 3,167,206 A | 1/1965 | Nelson |

(Continued)

FOREIGN PATENT DOCUMENTS

| CN | 101730636 | 6/2010 |
| CN | 104727862 | 6/2015 |

(Continued)

OTHER PUBLICATIONS

USPTO; U.S. Appl. No. 17/352,605, Notice of Allowance and Fees Due (PTOL-85) dated Jan. 18, 2023; (pp. 1-9).

(Continued)

*Primary Examiner* — Craig Kim
(74) *Attorney, Agent, or Firm* — Fitch, Even, Tabin & Flannery LLP

(57) ABSTRACT

In some embodiments, apparatuses are provided herein useful to sealing a gap, such as a gap between a gas turbine engine nozzle flap and sidewall. An apparatus for sealing such a gap may be a plunger seal that includes a plunger, a retaining element, a guide pin, and a biasing element. The plunger includes a sealing edge and an actuating edge having at least one recess and an opening formed therein. The biasing element and a portion of the guide pin are nested in the recess. The retaining element anchor the plunger to the retaining element. The retaining element also anchors the plunger seal to the housing When installed in a gap, the housing engages the flap and the plunger engages the sidewall. The biasing element is under compression and urges the guide pin into the actuating edge to urge the plunger toward the sidewall and seal the gap.

20 Claims, 12 Drawing Sheets

(58) Field of Classification Search
CPC ........ F01D 11/008; F01D 25/00; F01D 25/30; F01D 25/305; F05D 2240/00; F05D 2240/55; F05D 2240/57; F05D 2240/58; F05D 2240/59
See application file for complete search history.

(56) References Cited

U.S. PATENT DOCUMENTS

| | | | |
|---|---|---|---|
| 3,422,981 A | 1/1969 | Obrien | |
| 4,575,006 A * | 3/1986 | Madden | F02K 1/805 239/265.29 |
| 4,575,099 A | 3/1986 | Nash | |
| 4,739,932 A * | 4/1988 | Szuminski | F02K 1/006 239/265.33 |
| 4,815,276 A * | 3/1989 | Hansel | F01D 25/00 60/803 |
| 5,115,979 A * | 5/1992 | Ellerhorst | F02K 1/805 239/127.3 |
| 5,143,292 A | 9/1992 | Corsmeier | |
| 5,323,965 A | 6/1994 | Froemming | |
| 5,522,546 A | 6/1996 | Jarvis | |
| 6,286,840 B1 | 9/2001 | Zettel | |
| 6,702,300 B1 | 3/2004 | Steinetz | |
| 7,775,048 B2 | 8/2010 | Grammel, Jr. | |
| 9,341,120 B2 * | 5/2016 | Barry, Jr | F02K 1/002 |
| 10,969,015 B2 * | 4/2021 | George | F02K 1/805 |
| 11,047,481 B2 | 6/2021 | Bidkar | |
| 2003/0037753 A1 | 2/2003 | McLachlan | |
| 2008/0000236 A1 | 1/2008 | Grammel | |
| 2013/0033005 A1 | 2/2013 | Treat | |
| 2013/0341872 A1 | 12/2013 | Barry, Jr. | |
| 2016/0076391 A1 | 3/2016 | Guinn | |
| 2016/0177767 A1 | 6/2016 | Slavens | |
| 2018/0149032 A1 * | 5/2018 | Boeck | F01D 11/005 |
| 2018/0202659 A1 * | 7/2018 | Stieg | F23R 3/002 |
| 2018/0328313 A1 | 11/2018 | Senofonte | |
| 2018/0335143 A1 * | 11/2018 | George | F16J 15/102 |
| 2019/0170007 A1 | 6/2019 | Davis | |
| 2019/0203842 A1 | 7/2019 | Bidkar | |
| 2022/0042423 A1 * | 2/2022 | Hopper | F01D 25/04 |
| 2022/0403798 A1 | 12/2022 | Shealy | |
| 2022/0412266 A1 | 12/2022 | Shealy | |
| 2022/0412464 A1 * | 12/2022 | Shealy | F16J 15/0887 |
| 2023/0054950 A1 * | 2/2023 | Shealy | F01D 25/30 |

FOREIGN PATENT DOCUMENTS

| | | | |
|---|---|---|---|
| CN | 109677624 | 4/2019 | |
| CN | 112610336 | 4/2021 | |
| CN | 113006884 | 6/2021 | |
| DE | 3026245 | 11/1997 | |
| EP | 2511481 A2 * | 10/2012 | ............ F01D 11/006 |
| EP | 3447246 A1 * | 2/2019 | ............ F01D 11/005 |
| EP | 3744964 | 12/2020 | |
| EP | 4086436 A1 * | 11/2022 | ............ F01D 9/041 |
| KR | 20190048387 | 5/2019 | |

OTHER PUBLICATIONS

USPTO; U.S. Appl. No. 17/362,391; Notice of Allowance Action dated May 11, 2023; (p. 10).
USPTO; U.S. Appl. No. 17/407,439, Application filed Aug. 20, 2021, entitled Plunger Seal Assembly and Sealing Method.
USPTO; U.S. Appl. No. 17/407,439; Non-Final Office Action dated Dec. 9, 2022 (p. 15).
USPTO; U.S. Appl. No. 17/578,717, Application filed Jan. 19, 2022, entitled Seal Assembly and Sealing Method.
USPTO; U.S. Appl. No. 17/578,717; Notice of Allowance dated Mar. 23, 2023 (p. 12).
USPTO; U.S. Appl. No. 17/578,717; Notice of Allowance dated Dec. 12, 2022 (p. 12).
USPTO; U.S. Appl. No. 17/578,717; Restriction Requirement dated Sep. 20, 2022; (p. 7).
USPTO; U.S. Appl. No. 17/352,605; Notice of Allowance and Fees Due (PTOL-85) dated May 9, 2023; (pp. 1-9).
USPTO; U.S. Appl. No. 17/361,479; Notice of Allowance and Fees Due (PTOL-85) dated Jan. 31, 2023; (pp. 1-9).
USPTO; U.S. Appl. No. 17/361,479; Notice of Allowance and Fees Due (PTOL-85) dated Feb. 6, 2023 (pp. 1-2).
USPTO; U.S. Appl. No. 17/361,479; Notice of Allowance and Fees Due (PTOL-85) dated Apr. 13, 2023 (pp. 1-9).
USPTO; U.S. Appl. No. 17/362,391; Non-Final Rejection dated Jan. 31, 2023 (pp. 1-8).
USPTO; U.S. Appl. No. 17/362,391; Notice of Allowance and Fees Due (PTOL-85) dated May 11, 2023 (pp. 1-9).
USPTO; U.S. Appl. No. 17/362,391; Notice of Allowance and Fees Due (PTOL-85) dated May 22, 2023 (pp. 1-2).
USPTO; U.S. Appl. No. 17/407,439; Notice of Allowance and Fees Due (PTOL-85) dated Apr. 18, 2023 (pp. 1-9).

* cited by examiner

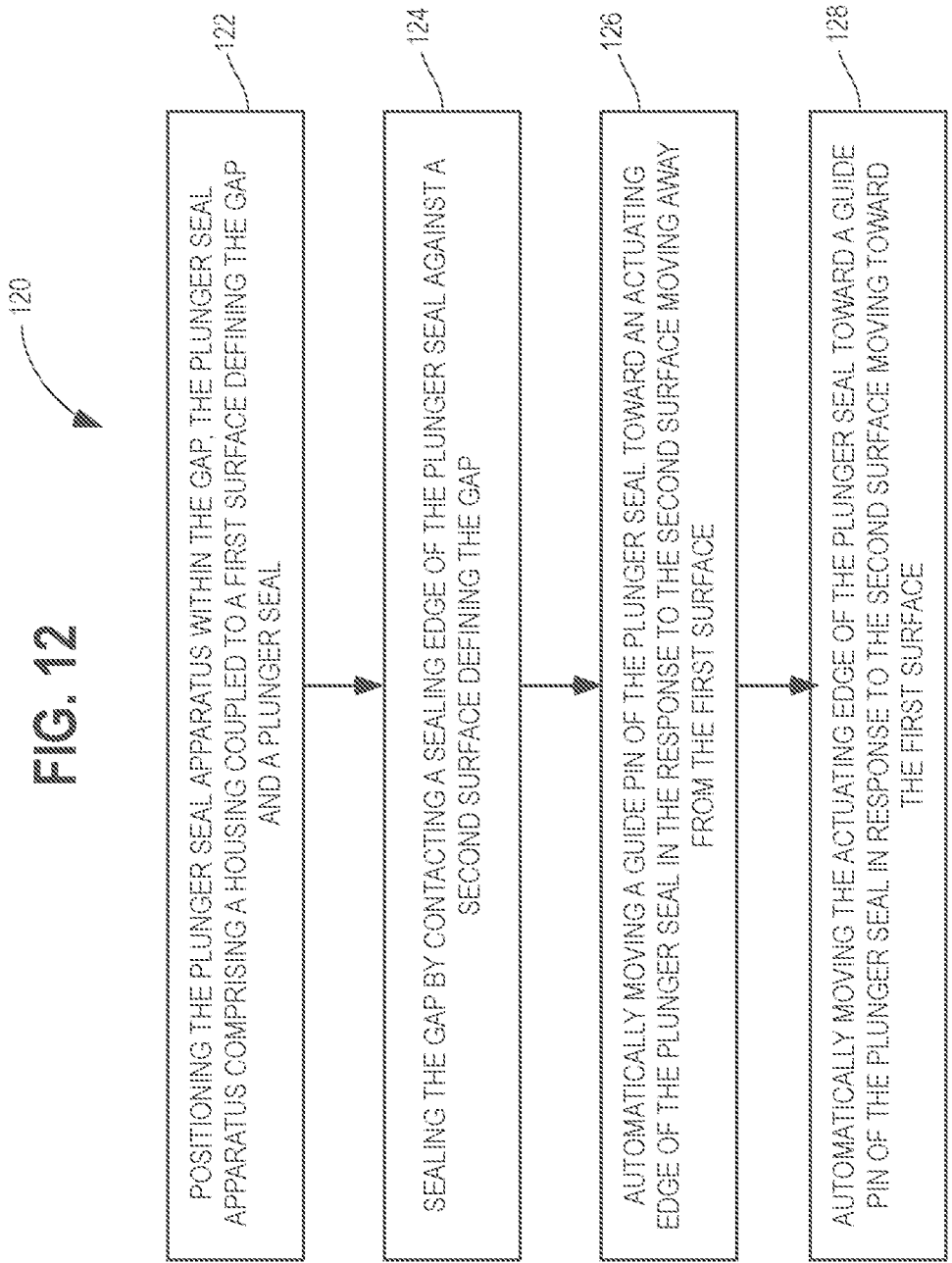

PLUNGER SEAL APPARATUS AND SEALING METHOD

GOVERNMENT INTERESTS

This invention was made with United States Government support. The Government has certain rights to this invention.

TECHNICAL FIELD

This technical field relates generally to dynamic seals for sealing a gap between a movable component and a stationary structure and, more specifically, to dynamic seals usable in a gas turbine engine exhaust nozzle.

BACKGROUND

A gas turbine engine, such as a gas turbine engine for powering an aircraft, may include an exhaust nozzle downstream of the turbine. The exhaust nozzle may include a movable flap positioned between the nozzle sidewalls. The flap may be actuated via a series of linkages to control a two-dimensional area within the nozzle to direct and accelerate the flow of core air from the engine for the purpose of thrust. Gaps between the flap and the sidewalls may create channels through which core air may flow, for example, due to a pressure gradient between the nozzle core and ambient environment surrounding the nozzle. Leakage of core air from the nozzle core to the ambient environment may reduce the thrust and efficiency of the engine.

BRIEF DESCRIPTION OF THE DRAWINGS

FIG. 12 is flow chart diagram of a method of sealing a gap using a plunger seal, according to some embodiments.

Figure 1:
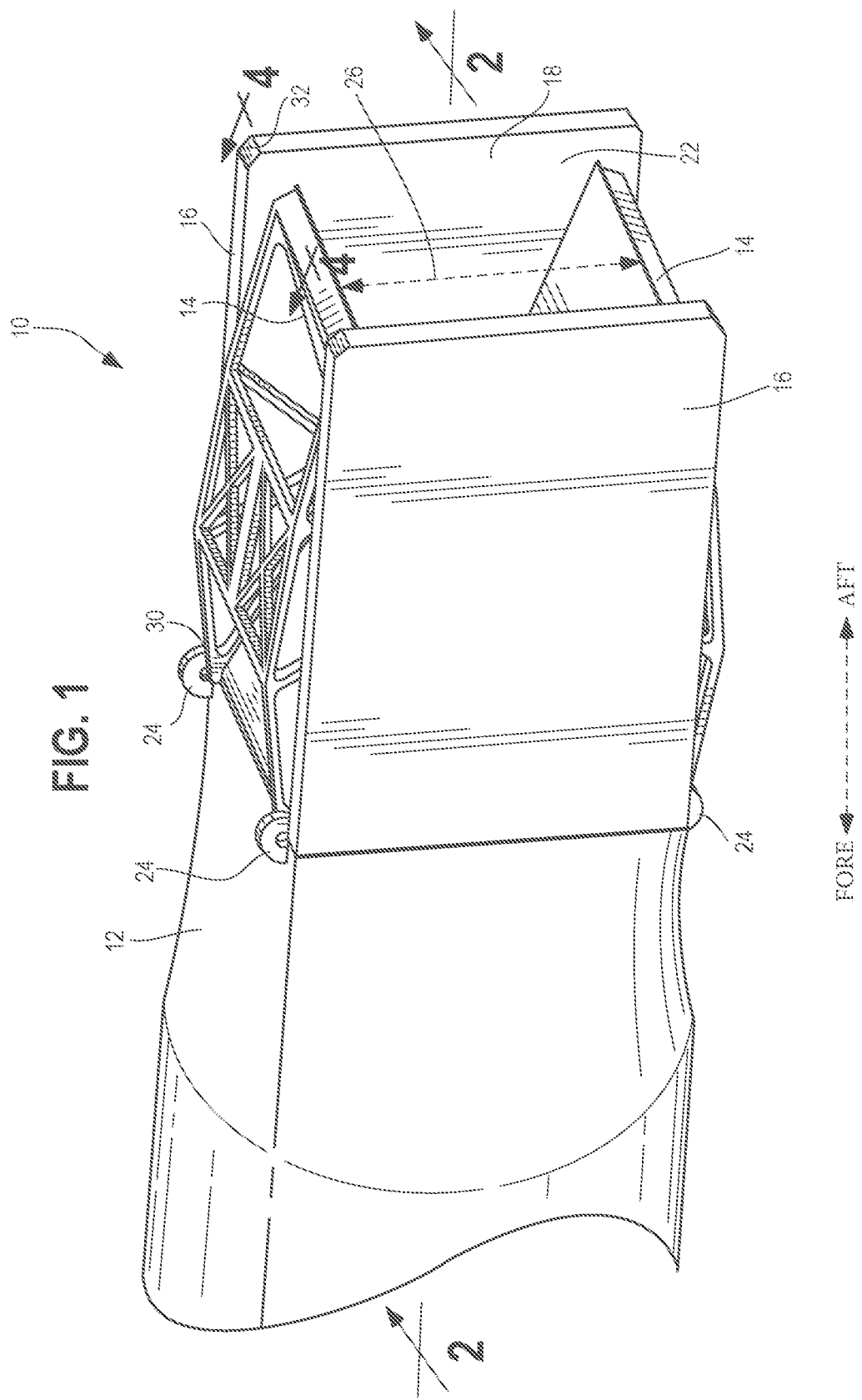
FIG. 1 is a perspective view of an exemplary gas turbine engine exhaust nozzle assembly, in accordance with some embodiments.

Elements in the figures are illustrated for simplicity and clarity and have not necessarily been drawn to scale. For example, the dimensions and/or relative positioning of some of the elements in the figures may be exaggerated relative to other elements to aid in understanding various embodiments. Also, common but well-understood elements that are useful or necessary in a commercially feasible embodiment are often not depicted to facilitate a less obstructed view of these various embodiments.

DETAILED DESCRIPTION

To eliminate or reduce the size of the gaps between the flap and the sidewalls and to seal core air within the nozzle core, a seal assembly may be positioned between the flap and the sidewall. In some instances, liners may be mounted to the sidewalls via one or more hangar structures. When the sidewall includes a sidewall liner, a seal assembly may be positioned between the flap and the sidewall liner, such that the seal assembly seals against the sidewall liner rather than directly to the sidewall.

During operation of the nozzle, the flap may move in one or more directions relative to the sidewall. Thus, the seal assembly for the gap between the flap and the sidewall may need to facilitate sliding motion. For example, the seal assembly may need to facilitate the sliding of the seal assembly along the sidewall while still maintaining a seal between the flap and the sidewall.

In addition to accommodating sliding motion along the sidewall, the seal assembly may also need to accommodate dynamic variations in the size of the gap between the flap and the sidewall and/or the sidewall liner. For example, the sidewall liner may distort or move due to pressure and temperature variations within the nozzle. In addition, although generally stationary, the sidewall may also deflect or shift towards or away from the flap. Such distortions may impact the size of the gap between the flap and the sidewall and/or the sidewall liner. Accordingly, the seal assembly may need to accommodate for variations in the size of the gap between the flap and the sidewall and/or the liner.

Plunger seals may be used to seal the gap between the flap and the sidewall and/or the sidewall liner. Plunger seals may work through three sliding contacts: contact against a housing, contact against the sidewall and/or liner, and contact with a neighboring plunger seal. However, plunger seals may provide a stiff interface with the sidewall and/or liner resulting in poor conformance and, thus, may result in higher leakage. Plunger seals may also involve careful balancing so that the plunger maintains contacts for the entire retracted depth and span of reaction forces, friction, and pressure loads. Further, plunger seals may include plungers that have a long retracted depth relative the plunger excursion creating packaging constraints.

Therefore, there remains a desire to have a plunger seal that is able to more effectively and efficiently seal a dynamic gap by controlling or prohibiting core air from flowing to the ambient environment at the nozzle, while improving conformance with a dynamic surface, reducing the risk of binding, and reducing the depth of the plunger seal.

With reference to FIGS. 1-4, there is illustrated a gas turbine engine 12 that produces core air flow. A nozzle assembly 10 is positioned at the aft of the gas turbine engine 12 to control the effect of the discharged core air. The nozzle assembly 10 includes upper and lower flaps 14 mounted for movement relative to one another between two opposing corresponding sidewalls 16. A gap 42 is located between outer edges of the flaps 14 and the sidewalls 16. Without seals, this gap 42 may allow air to exhaust inefficiently to the ambient surroundings.

As illustrated in FIGS. 5-10, there is a plunger seal 50 that controls or even prevents this core air from exhausting from a nozzle core 22 to the ambient environment 44 when installed in the gap 42. The plunger seal 50 includes a plunger 52, a retaining element 54, a guide pin 56, and a biasing element 58. The plunger 52 includes a sealing edge 60 and an actuating edge 62. The actuating edge 62 has at least one recess 70 and an opening 72 formed therein. The biasing element 58 and a portion of the guide pin 56 are nested in the recess 70 of the plunger 52, reducing the depth of the plunger seal 50. The biasing element 58 is disposed around the guide pin 56 between the retaining element 54 and the plunger 52. The retaining element 54 includes a back catch 76 that is inserted into the opening 72 in the plunger 52 to anchor the plunger 52 to the retaining element 54.

The plunger seal 50 is coupled to a housing 82 via the retaining element 54. When installed in the gap 42, the housing 82 engages the flap 14 and the sealing edge 60 of the plunger 52 engages the sidewall 16 to seal the gap 42. The biasing element 58 is under compression and urges the guide pin 56 into the actuating edge 62 of the plunger 52 to urge the plunger 52 toward the sidewall 16 and seal the gap 42. When multiple plunger seals 50 are positioned in series, the plungers 52 are coupled together using a double overlapped interface that reduces or even prevents the excursion of air around the plungers 52 in multiple directions.

Turning back to FIG. 1, the gas turbine engine 12 discharges exhaust gases, also referred to as core air, into the nozzle assembly 10. The nozzle assembly 10 may include one or more flaps 14 and one or more sidewalls 16. In this exemplary embodiment, the nozzle assembly 10 includes sidewalls 16, which are positioned opposite each other, and flaps 14, which are positioned opposite each other. In some embodiments, one or more of the sidewalls 16 further include a liner 18 mounted to the sidewall via one or more hangers 20 (not shown). The flaps 14 are moveable relative the sidewalls 16, which may be generally stationary. By some approaches, the flaps 14 may be pivotally supported by the gas turbine engine 12 at the fore end 30 of the nozzle assembly 10, for example, by rotating means such as hinges 24.

The flaps 14 and the sidewalls 16 define a nozzle core 22 that bounds core air exiting the gas turbine engine 12. Core air from the gas turbine engine 12 flows through the nozzle core 22 to create thrust for the gas turbine engine 12. Core air may flow through the nozzle core 22 from a fore end 30 to an aft end 32 of the nozzle assembly 10. The aft end 32 of the nozzle assembly 10 defines an outlet 26 that is generally rectangular in shape for discharging core air from the nozzle assembly 10 to the ambient environment 44. In some approaches, the flaps 14 are movable to direct the flow and pressure of core air within the nozzle core 22. For example, the flaps 14 may be vertically movable to adjust the size of the outlet 26 of the nozzle assembly 10.

Figure 2:
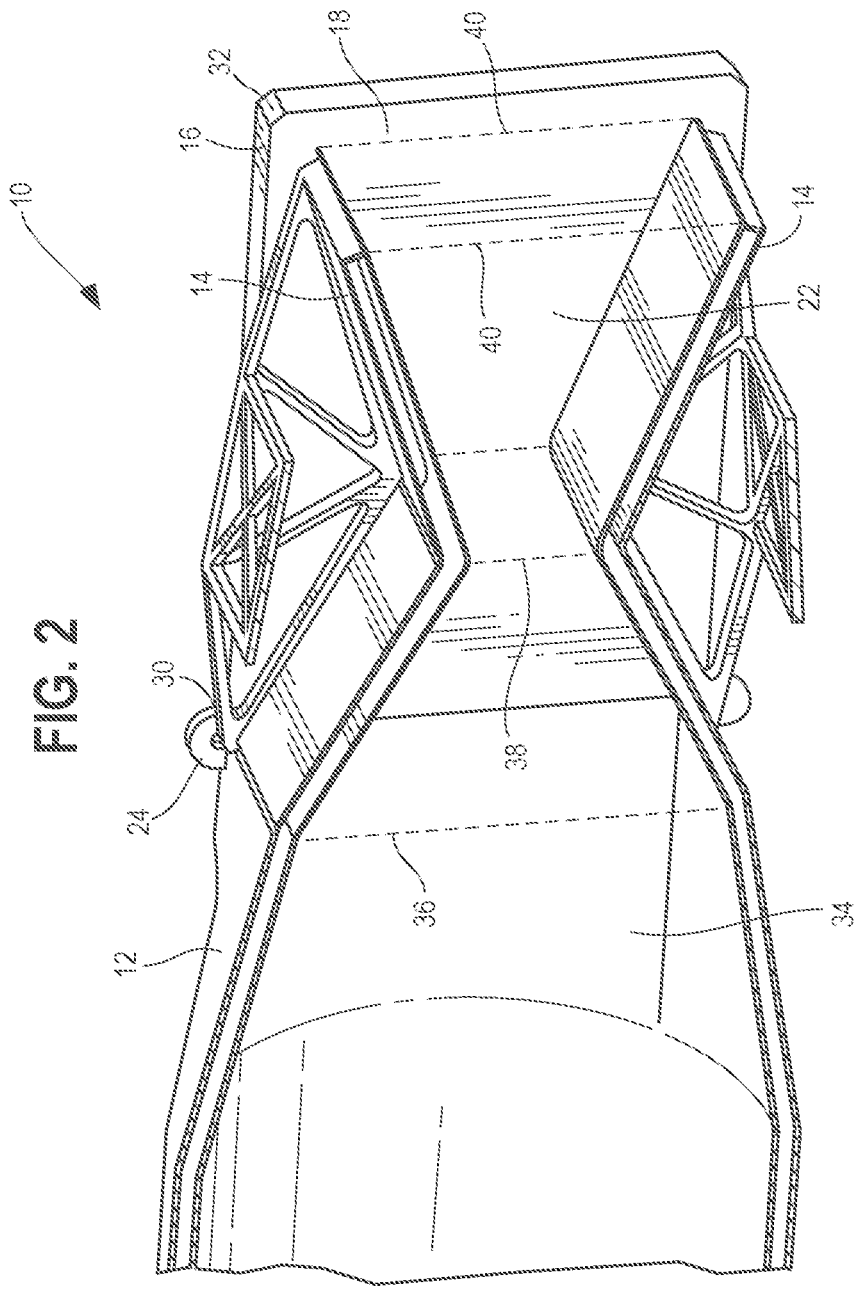
FIG. 2 is a cross-sectional view of the nozzle assembly of FIG. 1 taken along line 2-2 of FIG. 1.

Turning to FIG. 2, an engine core 34 of the gas turbine engine 12 is upstream of the nozzle assembly 10 such that core air flows from the engine core 34 into the nozzle core 22. As shown in FIG. 2, in some embodiments, the flaps 14 of the nozzle assembly 10 are actuated to vary the one or more cross-sectional areas of the nozzle core 22. In this manner, the nozzle assembly 10 is a variable two-dimensional nozzle assembly. The flaps 14 may be actuated, for example by pivoting about the hinges 24. The nozzle core 22 includes a first cross-sectional area 36, a second cross-sectional area 38, and a third cross-sectional area 40. The flaps 14 control the size of the second cross-sectional area 38 and the third cross-sectional area 40.

During operation of the gas turbine engine 12, the flaps 14 create a pressure gradient in the nozzle core 22 of the nozzle assembly 10. For example, pressure of the core air in the nozzle core 22 decreases from the fore end 30 to the aft end 32 of the nozzle core 22. That is, the pressure of the core air decreases from the first cross-sectional area 36 to the second cross-sectional area 38 to the third cross-sectional area 40.

Figure 3:
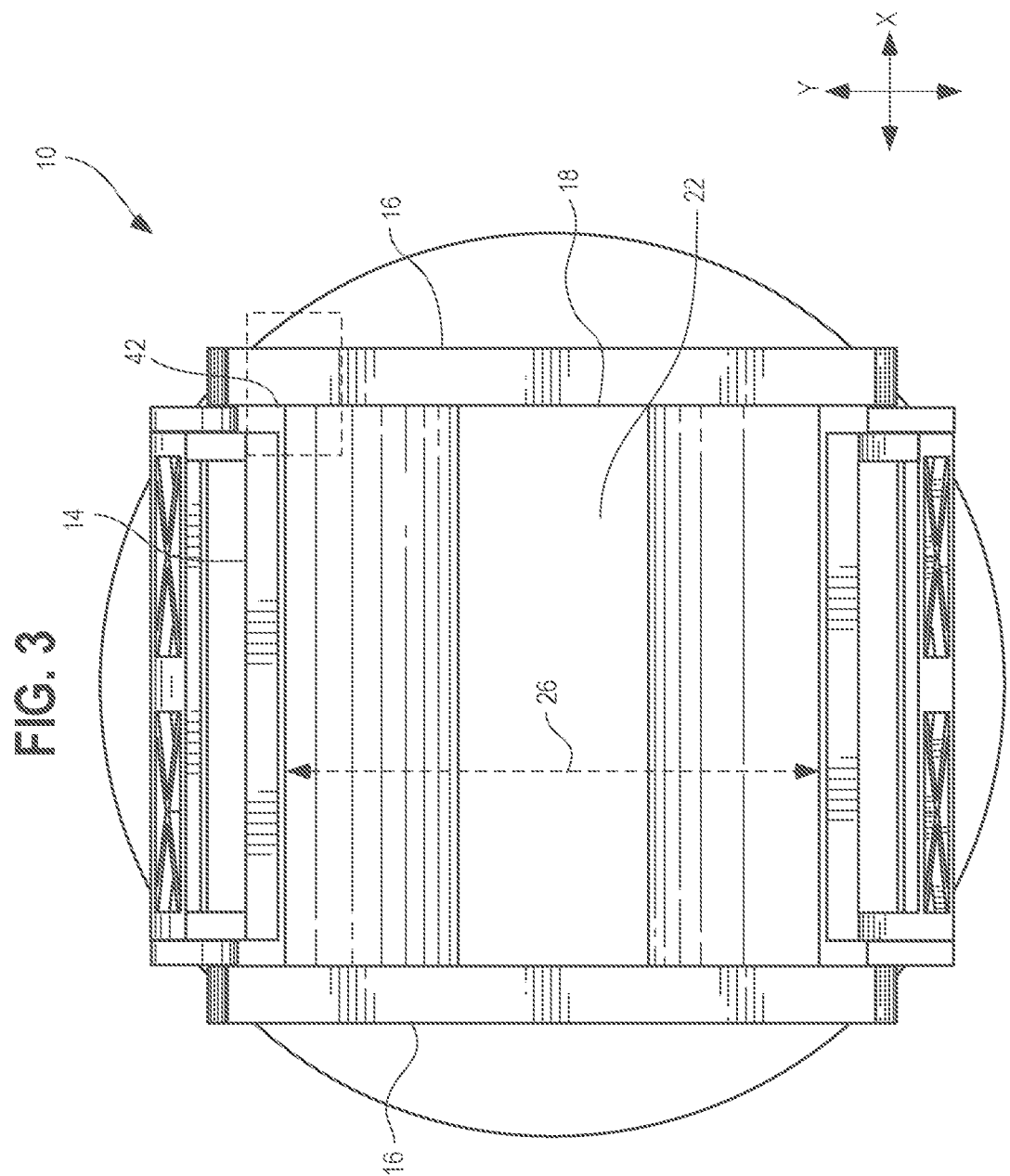
FIG. 3 is an end elevation view of the nozzle assembly of FIG. 1 taken from an aft end of the nozzle assembly.

Turning to FIG. 3, a gap 42 between the flap 14 and the sidewall 16 extends along the length of the flap 14 (i.e., from the fore end 30 to the aft end 32 of the nozzle assembly 10 as shown in FIG. 1). The gap 42 may be continuous or interrupted at one or more locations. The size of the gap 42 may vary dynamically during operation of the nozzle assembly 10. During operation, the flaps 14 move along the Y-direction shown in FIG. 3. This motion of the flaps 14, for example, varies the size of the outlet 26 of the nozzle assembly 10. Additionally, during operation, the sidewall 16 may shift along the X-direction shown in FIG. 3. For example, the pressure of core air in the nozzle core 22 may urge the sidewall 16 away from the flap 14, increasing the size of the gap 42. Accordingly, the gap 42 may be narrower when the nozzle core 22 is at atmospheric pressure than when the nozzle core 22 receives air from the engine core 34 during operation of the nozzle assembly 10. In addition to motion of the sidewall 16, the liner 18 of the sidewall 16 may also distort during operation, causing the liner 18 to shift along one or more of the X-direction and Y-direction. Such distortion in the liner 18 may occur, for example, due to changes in temperature and pressure along the nozzle core 22. A plunger seal 50 (not shown in FIG. 3) is installed in the gap 42 between the flap 14 and the sidewall 16.

Figure 4:
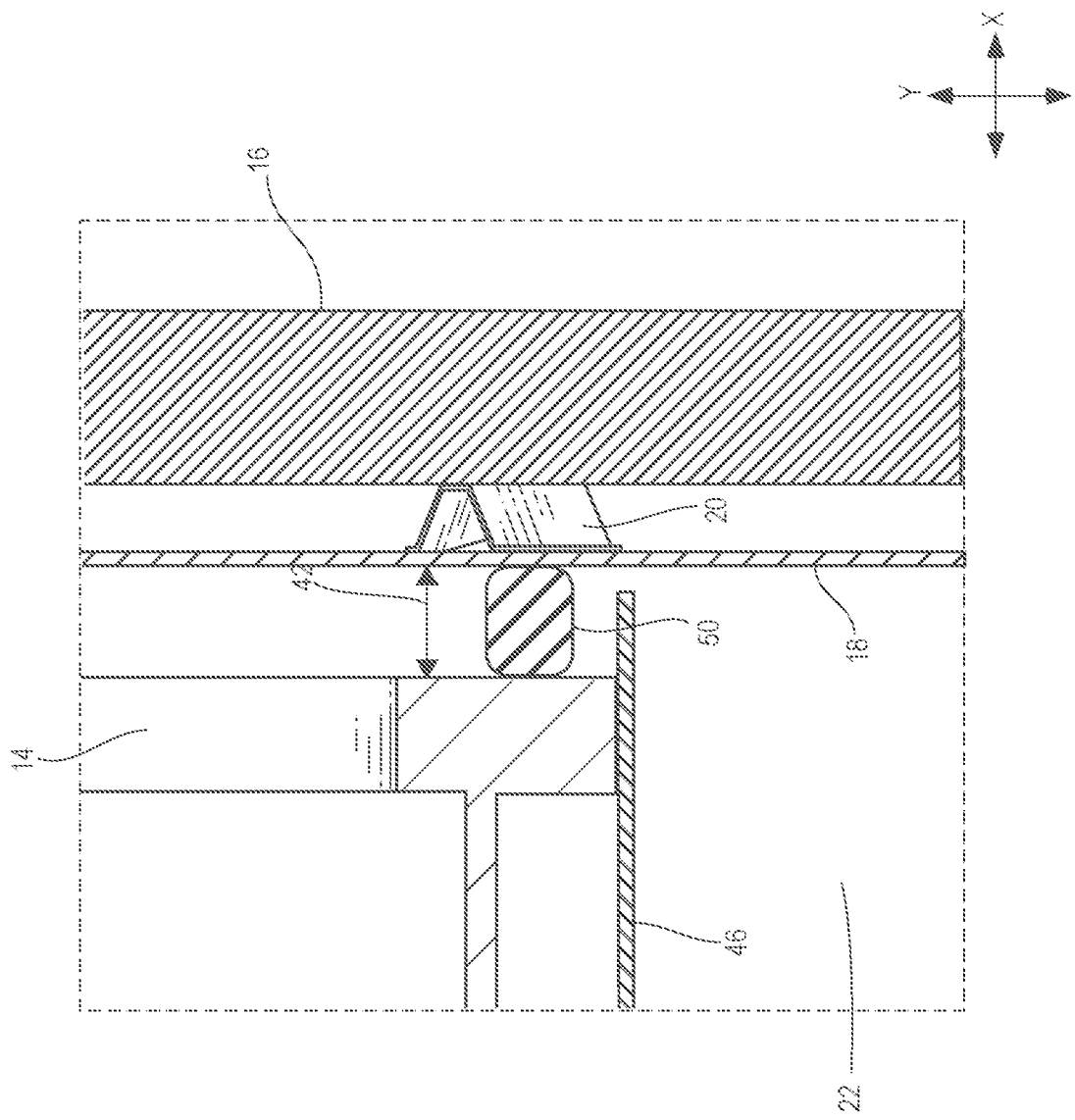
FIG. 4 is an enlarged, cross-sectional view, taken along line 4-4 in FIG. 1 of a portion of the nozzle assembly of FIG. 1.

With reference to FIG. 4, the gap 42 extends generally between the flap 14 and the sidewall 16. In the nozzle assembly 10, the sidewall 16 includes a liner 18, which is mounted to the sidewall 16 via hangers 20. Accordingly, the gap 42 extends between the flap 14 and the liner 18. The flap 14 may further include a flap liner 46 positioned at an end of the flap 14 adjacent the nozzle core 22. The flap liner 46, or portions thereof, may extend into the gap 42.

The nozzle assembly 10 includes a plunger seal 50 and a housing 82 positioned in the gap 42. The housing 82 is mounted to the flap 14 and the plunger seal 50 is received by a channel 84 in the housing 82. The plunger seal 50 and the housing 82 bridge the gap 42 between the flap 14 and the sidewall 16 to seal the gap 42. In this manner, the plunger seal 50 reduces the flow of core air from the nozzle core 22 through the gap 42 which may decrease or effect the flow of core air from the nozzle core 22 to the ambient environment 44 surrounding the nozzle assembly 10.

Figure 5:
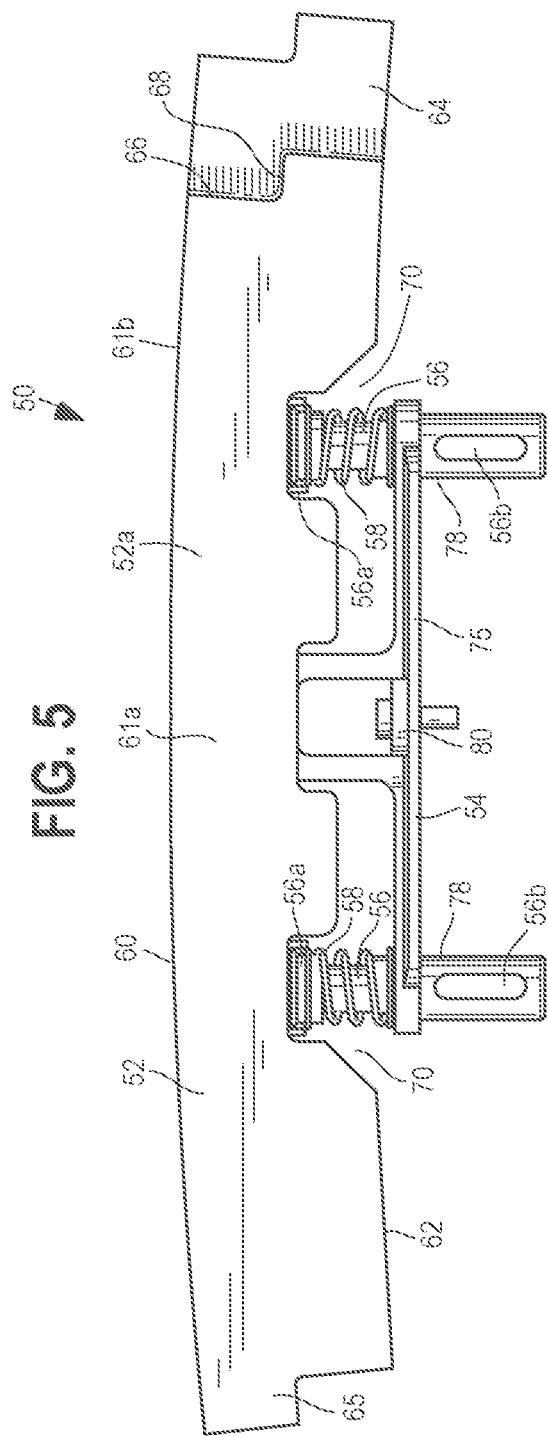
FIG. 5 is a top elevation view of a plunger seal, in accordance with some embodiments.
Figure 6:
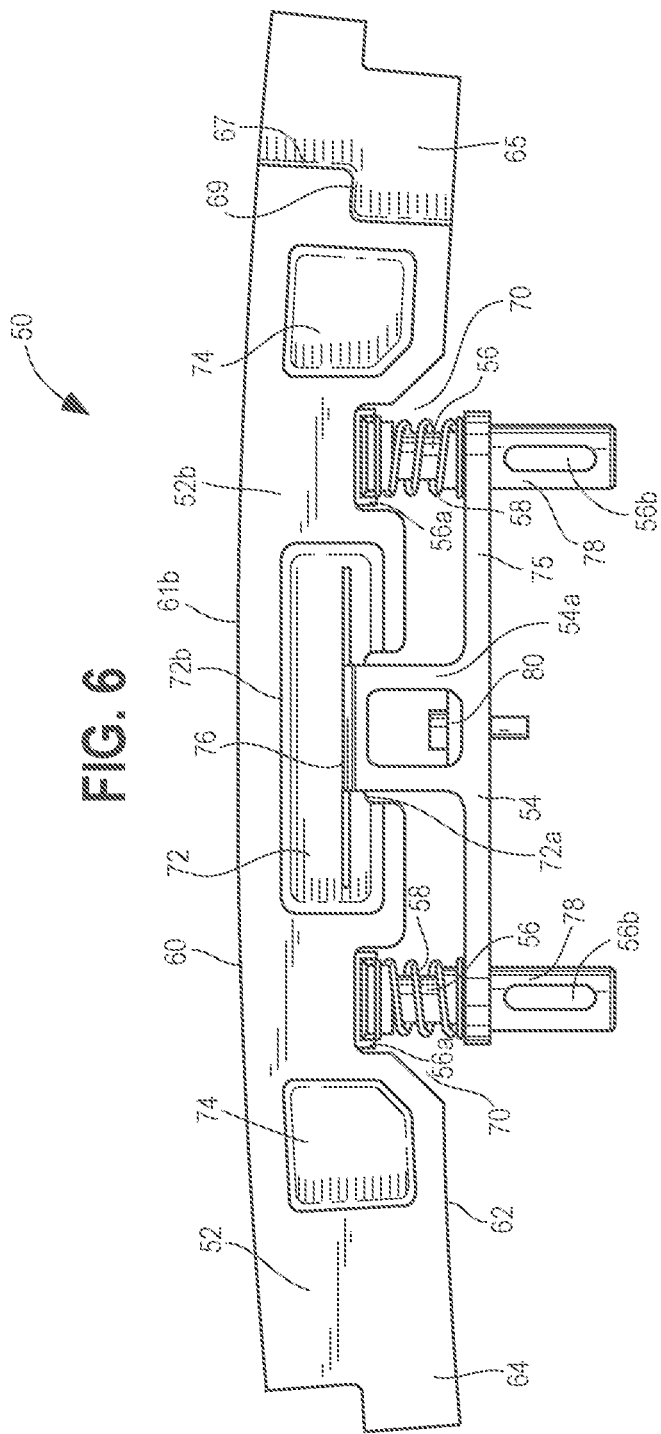
FIG. 6 is a bottom elevation view of the plunger seal of FIG. 5.

As shown in FIGS. 5 and 6, the plunger seal 50 includes a plunger 52, a retaining element 54, at least one guide pin 56, and at least one biasing element 58.

The plunger 52 includes a sealing edge 60 and an actuating edge 62 opposite the sealing edge 60. A top surface 52a of the plunger 52 defines a first sealing face 61a. The sealing edge 60 of the plunger 52 defines a second sealing face 61b. The actuating edge 62 of the plunger 52 includes at least one locator, such as a recess 70, to place or set the at least guide pin 56 in a particular spot or position along the actuating edge 62 of the plunger 52. In addition, the plunger 52 further includes an opening 72 (not shown in FIG. 5) formed therein. The opening 72 may be a cavity (e.g., a hollowed-out portion of the plunger), recessed portion, or recessed surface formed in the plunger 52 that is configured to receive the back catch 76 of the retaining element 54. It is contemplated that the opening 72 may extend all the way through a bottom wall of the plunger 52 to form a hole; however, as depicted in FIG. 6, the opening 72 only extends through a portion of the plunger 52 to create a recessed portion or cavity in the plunger 52. The opening 72 is coupled to a gap 72a in the actuating edge 62 so that a portion of the retaining element may extend through the gap 72a to position the back catch 76 within the opening 72. When the plunger seal 50 is assembled, the back catch 76 is moveably retained within the opening 72. The plunger 52 further includes a first end portion 64 and a second end portion 65. The first end portion 64 and the second end portion 65 connect the sealing edge 60 to the actuating edge 62. The first end portion 64 includes a first stepped edge 66 that defines a first land 68. Similarly, the second end portion 65 includes a second stepped edge 67 that defines a second land 69. The first stepped edge 66 is configured to mate with the second stepped edge 67. In some approaches, the plunger 52 further includes one or more lightening holes 74 (not shown in FIG. 5) formed in the plunger 52 to reduce the weight of the plunger 52. The lightening holes 74 may be cavities or recessed portions or recessed surfaces that are formed in the plunger 52. It is contemplated that the lightening holes 74 may be formed in an interior of the plunger 52, however, as depicted in FIG. 6, the cavities are formed in an exterior surface of the plunger 52.

In some approaches, the plunger 52 may be made of a metal such as a high-temperature alloy. In other approaches, the plunger 52 may be made of at least one of a polymer matrix composite (PMC) and a ceramic matrix composite (CMC). For example, the plunger 52 may be made of a composite material such as carbon or glass fibers including a polyimide or bismaleimide (BMI) resin. In some approaches, the plunger 52 is made of a material designed to operate in the range of about 350° F. to about 2800° F. It is contemplated that a plunger 52 made of PMC and/or CMC may replace a metal plunger while reducing the weight of the plunger 52 yet maintaining the ability to withstand high design temperatures in the range of about 350° F. to about 2800° F. It is also contemplated that such a composite material may wear during operation to create a tighter seal. For example, as the sealing faces (i.e., the first sealing face 61a and the second sealing face 61b) of the plunger 52 wear it is contemplated that they may conform more tightly to surfaces at the sealing interfaces. Further, a composite material may allow interfaces of the plungers 52 (e.g., interfaces between two adjacent plungers 52) to wear into and conform to each other due to the nature of the composite material, further reducing leakage around the plunger seal 50. Additionally, the use of a composite material may improve conformability of the sealing edge 60 of the plunger 52, for example, against a curved or complex surface such as the sidewall 16.

The retaining element 54 includes a body 75, the back catch 76 and at least one canister 78. In some aspects, the body 75 of the retaining element 54 is shorter than the plunger 52 to stabilize the plunger seal 50. The back catch 76 may be configured to be received by the opening 72 in the plunger 52. In some approaches, the back catch 76 is a plate. The plate may be oriented such that a face of the plate is aligned with a wall 72b of the opening 72 and, accordingly, the face of the plate lies in a plane parallel to the wall 72b of the opening 72. For example, a back catch 76 shaped as a rectangular plate (as is depicted in FIGS. 5 and 6) may permit the plunger 52 to move towards and away from the body 75 of the retaining element 54 while restraining sideways movement. It is contemplated that the back catch 76 may be rectangular, however, may also be formed in other suitable shapes, for example, depending on the shape of the opening 72. A portion 54a of the retaining element 54 is coupled to the back catch 76 and extends through the gap 72a to position at least a portion of the back catch 76 within the opening 72. The back catch 76 may be designed to allow the plunger 52 to move freely according to certain degrees of freedom while also remaining anchored to the retaining element 54. Further, the back catch 76 may prevent the plunger 52 from releasing into the flow path of the nozzle core 22.

The body 75 of the retaining element 54 further includes at least one canister 78. The canister 78 is a cylindrical cavity on an end of the body 75 opposite the back catch 76. The body 75 of the retaining element 54 may further include an attachment mechanism 80 to anchor the retaining element 54 to the housing 82 (not shown in FIGS. 5 and 6). The attachment mechanism 80 may be any suitable fastener such as, for example, a plain nut or a nut plate and bolt so that the attachment mechanism 80 can be easily removed.

The retaining element 54 may be welded or brazed to the housing 82 (not shown) and, in some aspects, in such a configuration, the retaining element 54 is configured to enable removal of the plunger 52 so that the plunger seal 50 may be disassembled when needed. The retaining element 54 may be made of a high-temperature alloy. In some approaches, the retaining element 54 is made of a material designed to operate in the range of about 350° F. to about 2800° F.

The at least one guide pin 56 includes a head portion 56a and a shaft 56b. In some approaches, the head portion 56a is rounded. A head portion 56a that is rounded may reduce wear on the plunger 52, for example, by eliminating corners that may dig into the plunger 52. A head portion 56a that is rounded versus to cylindrical may also maintain a more uniform loading over a surface of the plunger 52, for example, by providing loading across a surface as opposed to loading across an edge. The guide pin 56 may be made of a high-temperature alloy. In some approaches, the guide pin 56 is made of a material designed to operate in the range of about 350° F. to about 2800° F.

The at least one biasing element 58 may be any resilient device that can be pressed or pulled and returns to its former shape when released. The biasing element 58 is operably coupled to the plunger 52 and/or the guide pin 56. It is contemplated that the biasing element 58 may be operably couple with the plunger 52 and/or the guide pin 56 in any suitable manner so as to automatically provide an outward biasing of the plunger 52. The biasing element 58 may be adjacent to the guide pin 56. In some approaches, the biasing element 58 may be a spring such as a coil spring or a wave spring. The spring may define an interior and, in some approaches, at least a portion of the guide pin 56 is disposed in the interior of the spring. The biasing element 58 may be made of a high-temperature alloy. In some approaches, the biasing element 58 is made of a material designed to operate in the range of about 350° F. to about 2800° F.

In some embodiments, the plunger seal 50 includes multiple guides pins including, by way of non-limiting illustration, two guide pins 56. In the example of two guide pins, the two guide pins 56 can be spaced along the body defined by the plunger. In one non-limiting example the two guide pins 56 can be positioned on opposite sides of the opening 72 in the plunger 52. In some approaches, the two guide pins 56 may be substantially parallel. Further still, by way of further non-limiting embodiment, corresponding recesses 70 can be included in the actuating edge 62 of the plunger 52 and the two canisters 78 can be located in the retaining element 54 to receive the two guide pins 56. The plunger seal 50 can also include a corresponding number of biasing elements 58, with one biasing element 58 disposed around each guide pin 56. It is contemplated that including guide pins 56 on each side of the opening 72 in this manner may improve the stability of the plunger 52.

When the plunger seal 50 is assembled, the head portion 56a of the guide pin 56 is received by the recess 70 in the plunger 52. In non-limiting examples, the biasing element 58 is disposed around the shaft 56b of the guide pin 56. It is contemplated that other configurations may be employed in which the biasing element 58 is positioned adjacent to the guide pin 56. The biasing element 58 and a first portion of the shaft 56b of the guide pin 56 are received by the recess 70. A second portion of shaft 56b is received by the canister 78. When assembled, the biasing element 58 is positioned between the plunger 52 and the retaining element 54. In particular, the biasing element 58 is in contact with a head portion 56a of the guide pin 56 and the retaining element 54, which compresses the biasing element 58 when the plunger seal 50 is in an assembled configuration. The retaining element 54 is coupled to the actuating edge 62 of the plunger 52. In particular, the back catch 76 of the retaining element 54 is received by the opening 72 in the plunger 52 to anchor the plunger 52 to the retaining element 54. The retaining element 54 is also coupled to the housing 82 (not shown in FIGS. 5 and 6) via the attachment mechanism 80 to anchor the plunger seal 50 to the housing 82 (not shown).

As shown in FIGS. 5 and 6, the guide pin 56 and the biasing element 58 are recessed in the plunger 52. In this manner, the overall height of the biasing element 58 may be reduced or increased and, accordingly, the height of the plunger seal 50 in an assembled configuration may also be reduced or increased based on a given space. The parameters of the biasing element 58 design may be modified to enable a given force that is needed to adequately seal the gap 42 across the sealing edge 60 before sealing is invariably overcome by pressure, such as pressure of a fan or pressure of the nozzle core 22. Accordingly, the plunger seal 50 may be used in applications where space is limited.

Figure 7:
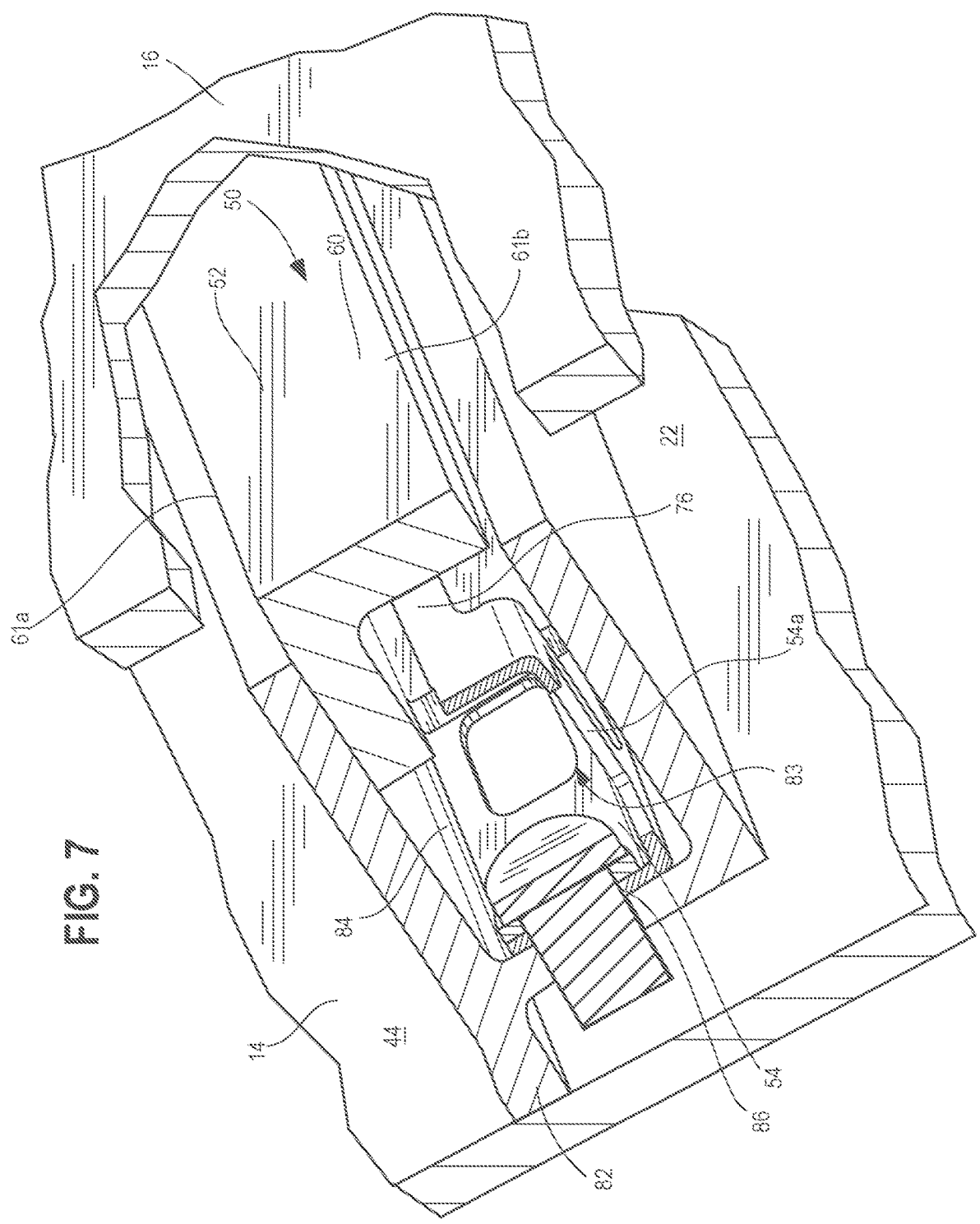
FIG. 7 is a cross-sectional, perspective view of the plunger seal of FIG. 5 installed in a housing.

Turning to FIG. 7, the plunger seal 50 is installed or seated in the housing 82. The housing 82 includes a channel 84 formed therein. The channel 84 is configured to receive the plunger seal 50. The housing 82 is configured to be coupled to the retaining element 54, for example via the attachment mechanism 80. In some approaches, the housing 82 includes an attachment portion 86 that is configured to couple the housing 82 to the attachment mechanism 80. In one non-limiting example shown in FIG. 7, the attachment portion 86 is an opening. A bolt or other attachment mechanism 80 may be inserted through the opening to couple the retaining element 54 to the housing 82.

It is contemplated that the housing 82 may be segmented or continuous. Further, the housing 82 may be configured to receive a plunger seal 50 or a series of plunger seals 50.

In operation, the plunger seal 50 is installed in the gap 42 between the flap 14 and the sidewall 16 (shown in FIG. 4). When installed in the gap 42, the housing 82 is coupled to the flap 14. In some aspects, the housing 82 may be integral with the flap 14. For example, the housing 82 may be a machined integral slot in the flap 14. In other aspects, the housing 82 may be coupled to the flap 14 via any suitable mechanism or via welding or brazing.

Figure 8:
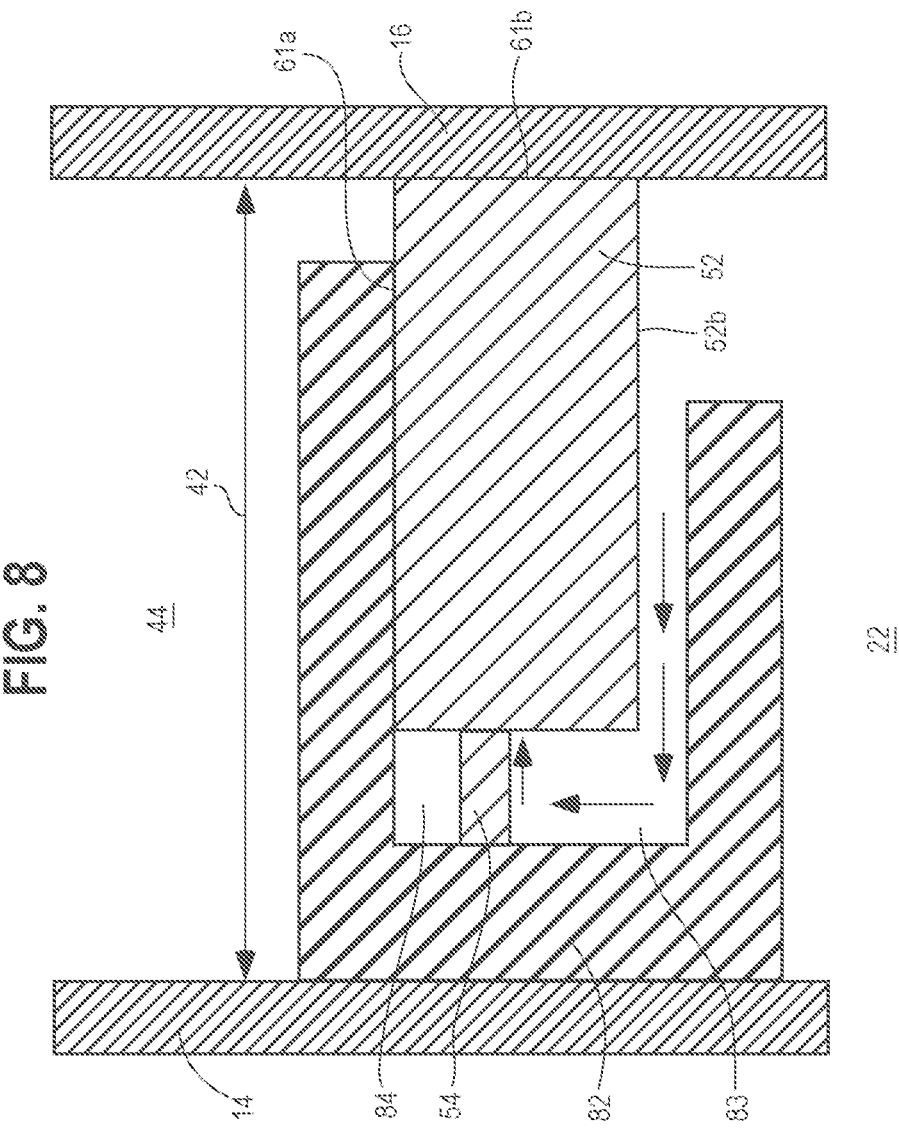
FIG. 8 is a schematic diagram illustrating a cross-section of a plunger seal and housing installed in a gap.

The plunger seal 50 is inserted into the channel 84 of the housing 82 such that the channel 84 seals a space around the plunger 52. The plunger seal 50 is installed in the housing 82 such that a bottom surface 52b of the plunger 52 (see in FIG. 6) is expose to a pressurized environment such as the nozzle core 22 and such that the top surface 52a of the plunger 52 (see FIG. 5) is exposed to the ambient environment 44. In this manner, the first sealing face 61a of the plunger 52, or at least a portion thereof, pushes against a surface of the channel 84. Further, the second sealing face 61b of the plunger 52, or at least a portion thereof, pushes against the sidewall 16. When the inserted into the housing 82, the plunger seal 50 and the channel 84 define a cavity 83 behind the plunger 52. The cavity 83 is a space that is bounded, at least in part, by the plunger 52 and the housing 82. In particular, the channel 84 of the housing 82 and the surfaces of the plunger 52 that are opposite the first sealing face 61a and the second sealing face 61b define the cavity 83. In operation, the cavity 83 is exposed to a pressure of the nozzle core 22. FIG. 8 further illustrates how the plunger 52 engages the housing 82 and the sidewall 16 to seal the gap 42 and reduce or prevent the excursion of air from the cavity 83 to the ambient environment 44.

When the plunger seal 50 is positioned in the housing 82, at least a portion of the retaining element 54 is disposed within the cavity 83. In particular the portion 54a of the retaining element 54 is disposed within the cavity 83 and positions the back catch 76 within the plunger 52. In operation, the back catch 76 moveably retains the plunger 52 to the retaining element 54. Additionally, at least a portion of the canister 78 and the guide pin 56 (not shown in FIG. 7) are disposed within the cavity 83. In some approaches, there is a hole (not shown in FIG. 7) in the housing 82 that receives the canister 78 and guide pin 56 so that only a portion of the canister 78 and guide pin 56 extends into the cavity 83, making the seal assembly more compact.

To anchor the plunger seal 50 to the housing 82, the retaining element 54 of the plunger seal 50 is coupled to the housing 82 via the attachment mechanism 80 (not shown). When installed in the gap 42, the biasing element 58 and the guide pin 56 are positioned between the retaining element 54 and the actuating edge 62 of the plunger 52. The sealing edge 60 of the plunger 52 is positioned adjacent to the sidewall 16. The head portion 56a of the guide pin 56 and the retaining element 54 maintain the biasing element 58 in a compressed state when the plunger seal 50 is installed in the gap 42. Compressing the biasing element 58 in this manner causes the biasing element 58 to exert a resilient force on the actuating edge 62 of the plunger 52. The resilient force of the biasing element 58 urges the plunger 52 towards the sidewall 16 to seal the gap 42.

When the sidewall 16 distorts or moves towards the plunger 52, the sidewall 16 exerts a force on the sealing edge 60 of the plunger 52 and urges the plunger 52 towards the retaining element 54. Such distortion of movement of the sidewall 16 also urges the plunger 52 further into the housing 82 and further compresses the biasing element 58. When the sidewall 16 distorts or moves away from the plunger 52, the biasing element 58 decompresses, urging the plunger 52 towards the sidewall 16. In this manner, the biasing element 58 allows the plunger 52 to react to changes in the size of the gap 42.

FIG. 8 provides a schematic diagram illustrating how the first sealing face 61a and the second sealing face 61b of the plunger 52 engage the housing 82 and the sidewall 16 to seal the gap 42. When installed in the gap 42 between the flap 14 and the sidewall 16, the channel 84 in the housing 82 and the plunger 52 define, at least in part, the cavity 83. Both the cavity 83 and the bottom surface 52b of the plunger 52 are exposed to the nozzle core 22. The retaining element 54 couples the plunger 52 to the housing 82. The design of the plunger 52 and the retaining element 54 permits the plunger 52 to move into and out of the channel 84. The design also permits the plunger 52 to push into the top wall of the channel 84.

The first sealing face 61*a* engages the top wall of the channel 84. The second sealing face 61*b* engages the sidewall 16. In this manner, the first sealing face 61*a* and the second sealing face 61*b* reduce or even prevent the excursion of air or other gases from the nozzle core 22 and the cavity 83 to the ambient environment 44.

Figure 9:
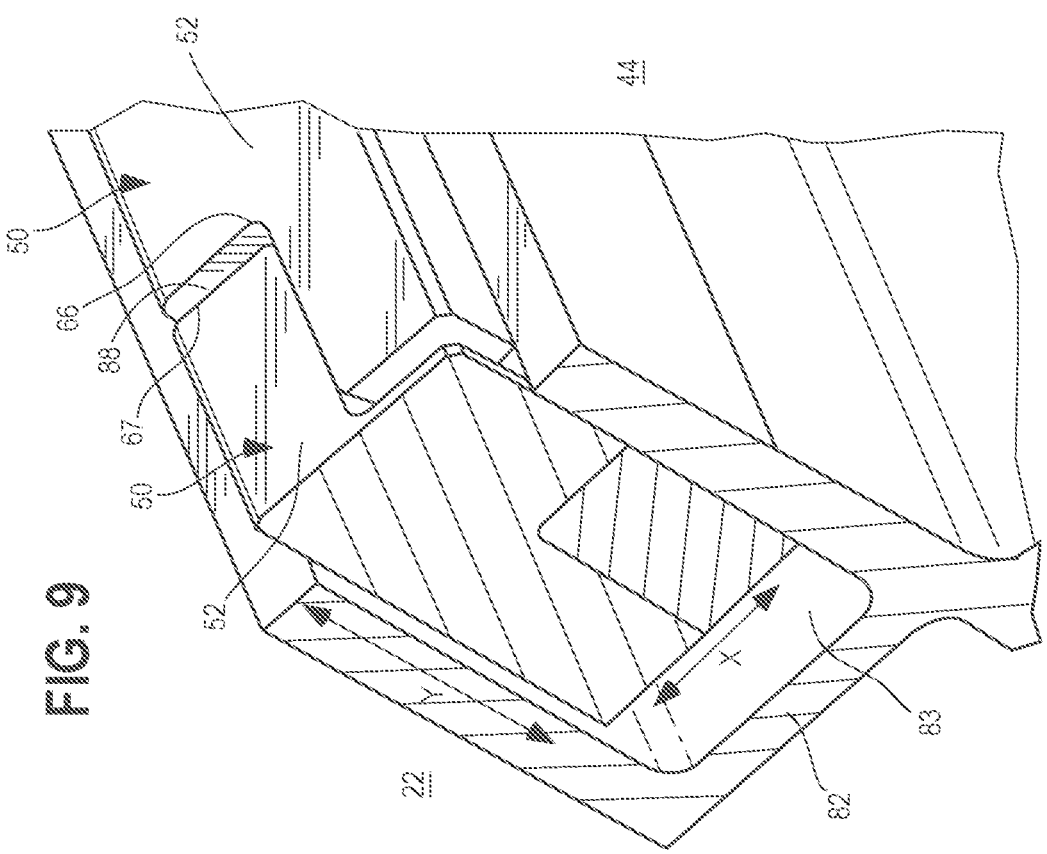
FIG. 9 is a cross-sectional, perspective view of the top side of an interface between two of the plunger seals of FIG. 5 coupled together.

In FIG. 9, an interface 88 between two of the plunger seals 50 installed in the housing 82 is illustrated. The plungers 52 of the plunger seals 50 are coupled together at the interface 88. The interface 88 is a double overlapped interface. That is, at the interface 88, the plungers 52 overlap in a first direction X and in a second direction Y. In particular, there is a lap joint between the plungers 52 of the plunger seals 50 that creates an overlap in the first direction X. Additionally, the plungers 52 include a first stepped edge 66 and a second stepped edge 67 that create an overlap in the second direction Y. The overlap of the plungers 52 in the first direction X reduces or even prevents the excursion of air or other gases around the plungers 52 in the first direction X, for example, from the nozzle core 22 to the ambient environment 44. Similarly, the overlap in the second direction Y reduces or even prevents the excursion of air or other gases around the plungers 52 in the second direction Y. For example, the overlap in the second direction Y reduces or even prevents the excursion of air or other gases from the cavity 83 to the ambient environment 44.

Figure 10:
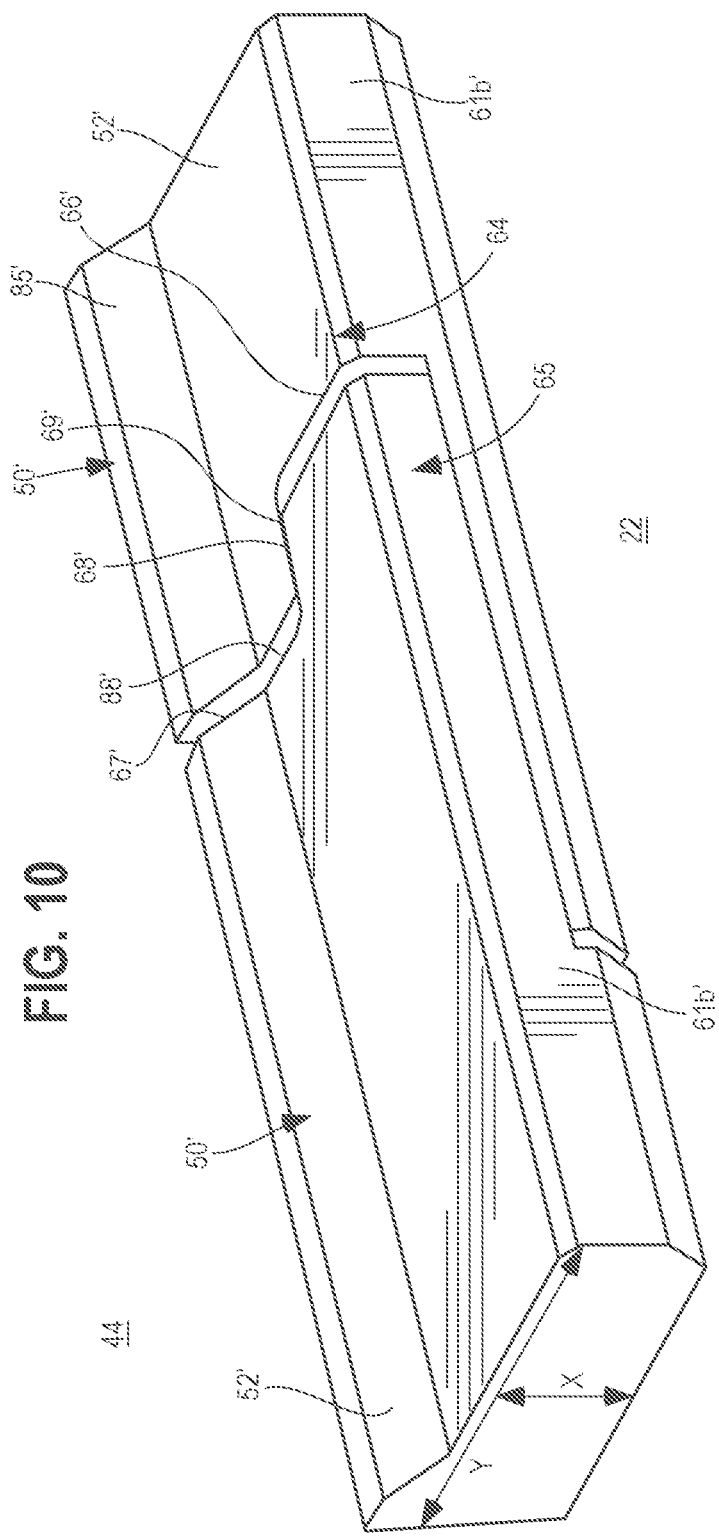
FIG. 10 is a perspective view of the plungers illustrated in FIG. 8.

FIG. 10 illustrates another embodiment of plungers 52' for the plunger seal 50 having a ridge 85'. The ridge 85' may, in some approaches, engage a groove in the housing 82. In particular, FIG. 10 illustrates the interface 88' between the plungers 52' of the plunger seals 50. As discussed above, the plungers 52' include a first end portion 64' that has a first stepped edge 66' and a second end portion 65' that has a second stepped edge 67'. The first stepped edge 66' defines a first land 68' and the second stepped edge 67' defines a second land 69'. When two plungers 52' are coupled together, the first land 68' engages the second land 69'. In this manner the first land 68' and the second land 69' create the interface 88' to reduce or prevent the excursion of air or other gases around the plungers 52' in the second direction Y. Sealing the plungers 52' in the second direction Y prevent pressurized air (or core air) from escaping from behind the plunger seal 50 to the second sealing face 61*b'* and to the ambient environment 44.

Figure 11A:
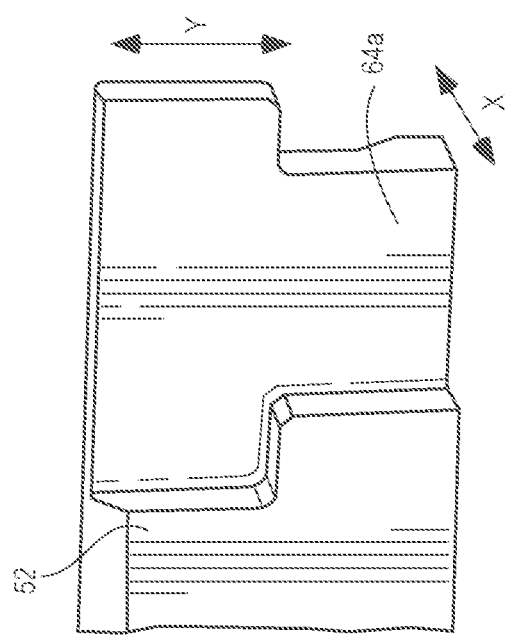
FIG. 11A is an alternative embodiment of an end portion of the plunger seal illustrated in FIG. 5.
Figure 11B:
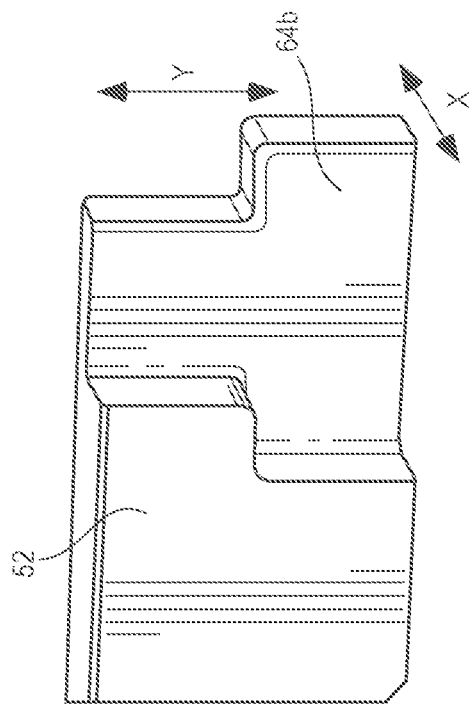
FIG. 11B is another alternative embodiment of an end portion of the plunger seal illustrated in FIG. 5.

FIGS. 11A and 11B illustrate alternative embodiments for the first end portion 64 of the plunger 52. FIG. 11A depicts a stepped end portion 64*a*. FIG. 11B depicts a stepped end portion 64*b*. It is contemplated that the steps on the stepped end portion 64*a* or the stepped end portion 64*b* may be single-directional or bi-directional. A single-direction step includes a step in one of the X-direction or Y-direction, and a bi-direction step includes a step in both the X-direction or Y-direction. The embodiments illustrated in FIGS. 11A and 11B depict a bi-directional step. The number and direction of the steps may depend on the design, the sealing surfaces, and the pressure. Sealing between the steps reduces or prevents leakage between the different segments (i.e., plungers 52) of the overall assembly (i.e., a series of plunger seals 50).

FIG. 12 is a flow diagram of a method 120 of sealing a gap, such as a gap between a movable flap and a stationary structure, according to some embodiments. A first surface and a second surface define the gap. In some approaches, the method 120 may employ the plunger seal 50 to seal the gap. In some embodiments, the gap is the gap 42 between the flap 14 and the sidewall 16 depicted in FIG. 4.

The method 120 includes positioning 122 a plunger seal assembly within the gap. The plunger seal assembly includes a housing and a plunger seal. The housing is coupled to a first surface defining the gap. The seal includes a plunger having an actuating edge and sealing edge. The seal also includes a retaining element coupled to the housing and having a back catch that anchors the plunger to the retaining element. The seal further includes a guide pin recessed within the plunger and a biasing element disposed around the guide pin.

The method 120 also includes sealing 124 the gap by contacting at least a portion of the sealing edge against the second surface defining the gap. The method 120 also includes automatically moving 126 the guide pin towards the actuating edge of the plunger in response to the second surface moving away from the first surface. The method 120 further includes automatically moving 128 the actuating edge of the plunger towards the guide pin to compress the biasing element in response to the second surface moving toward the first surface. In some approaches, the method 120 may also include sealing an end of the plunger seal using a double overlapped interface.

It is contemplated that the plunger seals described herein may be installed in any moveable and/or dynamic gap, for example, between any form of moveable and stationary structure.

It is also contemplated that the plunger seals and sealing methods described herein may be used to seal a gap between the sidewall 16 and the liner 18 or, when the liner 18 is not utilized, a gap between the sidewall 16 and the flap 14.

Conventional plunger seal are metal and typically carry a lot of weight in combination with a retaining feature. The cost is high due to precision machining and tolerances. Aspects of the present disclosure allow for using high temperature polymer matrix composites such as carbon or glass fibers using a polyimide, bismaleimide or ceramic matrix composites that make the structure comparatively light weight. Such light weight composites can also be easily machined, improving ease of manufacturing the plunger. Further still, another benefit includes that the seal interfaces will wear into each other and conform due to the nature of the composite material and reduce leakage. The double overlap lap bidirectional or single directional step gives the plunger seal extra sealing capabilities across the seal faces and through the seal interface. A uniquely designed back catch allows the plunger seal to move freely according to the freedoms of the design but also stay retained within the assembly.

Additionally, conventional plunger seals made from metal may have leakage at hard sealing interfaces. Another benefit of the plunger seals of the present disclosure is that the use of high temperature polymer matrix composites or ceramic matrix composites creates a wearing relationship that allows the sealing interfaces of the plunger to wear into each other and conform to a surface to create a tighter seal, improve conformability and reduce leakage. Improved conformability may expand the structural design space in which the plunger seals described herein may be employed, for example, allowing for use in designs that require sealing against curved, irregular, or more complex surfaces as opposed to merely sealing against flat surfaces. Further still, improved conformability may improve performance in end-of-life conditions or other conditions where sealing interfaces have distorted, for example, from thermomechanical stresses.

Use of low modulus materials such as polymer matrix composites or ceramic matrix composites may also prevent or otherwise reduce binding from tip stabilizing elements that induce torsion. It is also contemplated that polymer matrix composites or ceramic matrix composites may have a low wear rate against metals. Further still, the plunger seals described herein allow for determinate leakages which enable a smaller and more consistent amount of purge flow to be used and lowers the amount of uncertainty in engine purge flow requirements.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Further aspects of the invention are provided by the subject matter of the following clauses:

A seal assembly, comprising: a seal, comprising: a plunger having an actuating edge and a sealing edge, the sealing edge opposite the actuating edge, at least one guide pin having a first portion adjacent the plunger, and a biasing element disposed to bias the at least one guide pin towards the actuating edge of the plunger, the sealing edge of the plunger moved to seal a gap.

The seal assembly of any preceding clause, wherein the actuating edge of the plunger includes an opening formed therein, and wherein the seal further includes a retaining element including a back catch moveably retained within the opening.

The seal assembly of any preceding clause, wherein a second portion of the at least one guide pin is operatively associated with the retaining element.

The seal assembly of any preceding clause, wherein the plunger further includes at least one locator formed in the actuating edge, and wherein the first portion of the at least one guide pin extends into at least a portion of the locator.

The seal assembly of any preceding clause, wherein the locator is a recess.

The seal assembly of any preceding clause, wherein the seal includes two guide pins positioned on opposite sides of the opening to stabilize the plunger and a locator corresponding to each guide pin.

The seal assembly of any preceding clause, wherein the plunger is made of a material comprising at least one of a polymer matrix composite and a ceramic matrix composite.

The seal assembly of any preceding clause, wherein the spring and the at least one guide pin are made of a material comprising a high-temperature alloy.

The seal assembly of any preceding clause, wherein the biasing element is a spring.

The seal assembly of any preceding clause, wherein the plunger further includes at least one lightening hole formed therein.

The seal assembly of any preceding clause, wherein the at least one guide pin includes a head portion having a rounded surface disposed adjacent to the actuating edge of the plunger.

The seal assembly of any preceding clause, further comprising a housing, wherein at least a portion of the seal is seated in the housing.

A gas turbine engine nozzle, comprising: a stationary structure; a movable flap adjacent the stationary structure; and a seal assembly disposed between the stationary structure and the movable flap to seal a gap between the stationary structure and the movable flap, the seal assembly comprising: a housing; and a first seal seated in the housing, the first seal comprising: a first plunger having a first actuating edge and a first sealing edge opposite the first actuating edge, the first actuating edge including an opening and at least one recess formed therein, a retaining element coupled to the housing and having a back catch that engages the opening to anchor the first plunger within the seal assembly, at least one guide pin having a first portion extending into at least a portion of the plunger and a second portion operatively associated with the retaining element, and a biasing element operably coupled to the at least one guide pin between the retaining element and the first plunger, wherein the biasing element urges the at least one guide pin into the first actuating edge of the first plunger to seal the gap with at least a portion of the sealing edge of the plunger.

The gas turbine engine nozzle of any preceding clause, wherein the first plunger further includes a first end portion, the first end portion connecting the first actuating edge to the first sealing edge, the first end portion having a first stepped edge that defines a first land.

The gas turbine engine nozzle of any preceding clause, further comprising: a second seal seated in the housing, the second seal including: a second plunger having a second actuating edge, a second sealing edge opposite the second actuating edge, and a second end portion connecting the second actuating edge to the second sealing edge, the second end portion having a second stepped edge configured to mate with the first stepped edge, the second stepped edge defining a second land that engages the first land.

The gas turbine engine nozzle of any preceding clause, wherein the first end portion overlaps the second end portion at a lap joint.

A method of sealing a gap, the method comprising: positioning a seal assembly within the gap, the seal assembly comprising a housing coupled to a first surface defining the gap and a seal, the seal including a plunger having an actuating edge and a sealing edge, a retaining element coupled to the housing and having a back catch that anchors the plunger to the retaining element, a guide pin recessed within the plunger, and a biasing element operably coupled to the guide pin; and sealing the gap by contacting at least a portion of the sealing edge against a second surface defining the gap.

The method of any preceding clause, further comprising automatically moving the guide pin toward the actuating edge of the plunger in response to the second surface moving away from the first surface.

The method of any preceding clause, further comprising automatically moving the actuating edge of the plunger toward the guide pin to compress the spring in response to the second surface moving toward the first surface.

It will be understood that various changes in the details, materials, and arrangements of parts and components which have been herein described and illustrated to explain the nature of the dynamic seals between moving components and stationary components may be made by those skilled in the art within the principle and scope of the appended claims. Furthermore, while various features have been described with regard to particular embodiments, it will be appreciated that features described for one embodiment also may be incorporated with the other described embodiments.

What is claimed is:

1. A seal assembly, comprising:
   a seal, comprising:
   a plunger having an actuating edge with at least one recess formed therein and a sealing edge, the sealing edge opposite the actuating edge,
   at least one guide pin, at least a portion of which is external to the plunger, the at least one guide pin having a first portion adjacent the plunger and received within the at least one recess, wherein the at least one guide pin is translatable relative to the actuating edge of the plunger, and
   a biasing element disposed to bias the at least one guide pin towards the actuating edge of the plunger, the sealing edge of the plunger moved to seal a gap.

2. The seal assembly of claim 1, wherein the actuating edge of the plunger includes an opening formed therein, and wherein the seal further includes a retaining element including a back catch moveably retained within the opening.

3. The seal assembly of claim 2, wherein a second portion of the at least one guide pin is operatively associated with the retaining element.

4. The seal assembly of claim 3, wherein the first portion of the at least one guide pin extends into at least a portion of the at least one recess.

5. The seal assembly of claim 4, wherein the seal includes two guide pins positioned on opposite sides of the opening to stabilize the plunger and a locator corresponding to each guide pin.

6. The seal assembly of claim 1, wherein the biasing element is coupled to the at least one guide pin.

7. The seal assembly of claim 1, wherein the plunger is made of a material comprising at least one of a polymer matrix composite and a ceramic matrix composite.

8. The seal assembly of claim 1, wherein the biasing element and the at least one guide pin are made of a material comprising a high-temperature alloy.

9. The seal assembly of claim 1, wherein the biasing element is a spring.

10. The seal assembly of claim 1, wherein the plunger further includes at least one lightening hole formed therein.

11. The seal assembly of claim 1, wherein the at least one guide pin includes a head portion having a rounded surface disposed adjacent to the actuating edge of the plunger.

12. The seal assembly of claim 1, further comprising a housing, wherein at least a portion of the seal is seated in the housing.

13. The seal assembly of claim 12, wherein the housing includes a channel that receives the at least one guide pin, the biasing element, and at least a portion of the plunger.

14. A gas turbine engine nozzle, comprising:
   a stationary structure;
   a movable flap adjacent the stationary structure; and
   a seal assembly disposed between the stationary structure and the movable flap to seal a gap between the stationary structure and the movable flap, the seal assembly comprising:
   a housing; and
   a first seal seated in the housing, the first seal comprising:
   a first plunger having a first actuating edge and a first sealing edge opposite the first actuating edge, the first actuating edge including an opening and at least one recess formed therein,
   a retaining element coupled to the housing and having a back catch that engages the opening to anchor the first plunger within the seal assembly,
   at least one guide pin at least a portion of which is external to the first plunger and having a first portion extending into the at least one recess and a second portion received by the retaining element, and
   a biasing element operably coupled to the at least one guide pin between the retaining element and the first plunger,
   wherein the biasing element urges the at least one guide pin into the first actuating edge of the first plunger to seal the gap with at least a portion of the first sealing edge of the first plunger.

15. The gas turbine engine nozzle of claim 14, wherein the first plunger further includes a first end portion, the first end portion connecting the first actuating edge to the first sealing edge, the first end portion having a first stepped edge that defines a first land.

16. The gas turbine engine nozzle of claim 15, further comprising:
   a second seal seated in the housing, the second seal including:
   a second plunger having a second actuating edge, a second sealing edge opposite the second actuating edge, and a second end portion connecting the second actuating edge to the second sealing edge, the second end portion having a second stepped edge configured to mate with the first stepped edge, the second stepped edge defining a second land that engages the first land.

17. The gas turbine engine nozzle of claim 16, wherein the first end portion overlaps the second end portion at a lap joint.

18. A method of sealing a gap, the method comprising:
   positioning a first seal assembly within the gap, the first seal assembly comprising a housing coupled to a first surface defining the gap and a seal, the seal including a first plunger having an actuating edge and a sealing edge, a retaining element coupled to the housing and having a back catch that anchors the first plunger to the retaining element, a guide pin recessed within the first plunger, and a biasing element operably coupled to the guide pin, the first plunger having a first stepped end portion with a first step in a first direction and a second step in a second direction;
   positioning a second seal assembly within the gap, the second seal assembly having a second plunger with second stepped end portion having a third step in the first direction and a fourth step in the second direction;
   sealing the gap by contacting at least a portion of the sealing edge against a second surface defining the gap; and
   sealing a space between the first plunger and the second plunger by overlapping the first stepped end portion and the second stepped end portion.

19. The method of claim 18, further comprising automatically moving the guide pin toward the actuating edge of the first plunger in response to the second surface moving away from the first surface.

20. The method of claim 18, further comprising automatically moving the actuating edge of the first plunger toward the guide pin to compress the biasing element in response to the second surface moving toward the first surface.

\* \* \* \* \*